United States Patent Office 3,743,626
Patented July 3, 1973

3,743,626
HYDROCURABLE OXAZOLIDINE-ISOCYANATE
COMPOSITIONS
William D. Emmons, Huntingdon Valley, Pa., assignor to Rohm and Haas Company, Philadelphia, Pa.
No Drawing. Continuation-in-part of application Ser. No. 768,905, Oct. 18, 1968. This application Jan. 30, 1970, Ser. No. 7,270
Int. Cl. C08g 22/00
U.S. Cl. 260—77.5 AQ    21 Claims

ABSTRACT OF THE DISCLOSURE

Compositions comprising an oxazolidine and a polyfunctional aliphatic or aromatic isocyanate cure in the presence of moisture to give polymeric materials. The compositions can be used in forming films, fibers, paints, seamless flooring, coatings, impregnants, and adhesives for both natural and synthetic materials, as well as in a wide variety of other applications.

CROSS-REFERENCE TO RELATED APPLICATION

This application is a continuation-in-part of copending U.S. application Ser. No. 768,905, of W. D. Emmons, filed Oct. 18, 1968, now abandoned.

This invention relates to compositions which comprise an oxazolidine and a polyfunctional isocyanate, and which will cure in the presence of water to give tough, chemically-resistant polymeric materials.

The reaction of isocyanates with active hydrogen compounds such as amines and alcohols to form polyureas and polyurethanes has been greatly studied in the prior art, and this general class of polymers has been found to possess many useful properties. Since isocyanates generally react quickly and efficiently with active hydrogen compounds at room temperature, these two components usually must be mixed together only at the time and place at which reaction is desired. In an approach to making so-called "one pot" formulations or compositions, in which the reacting materials are packaged together before using, and later activated, relatively unreactive derivatives of isocyanates have been used which will regenerate the free isocyanate upon heating. Various catalysts are also often contained in these compositions to facilitate the regeneration of isocyanate. However, this heating process has several disadvantages, especially when the polyurea or polyurethane is to be used as a coating, since, for example, the size of the article to be coated or the nature of the material of which the article is made may preclude heating to the temperature necessary for polymerization to occur. Thus, it would be extremely desirable to have polymer-forming compositions which are relatively stable on storage and which could be cured in the absence of any extensive heating and without the specific addition of other materials. Moreover, polyurea- or polyurethane-forming compositions having improved cure times would also be quite valuable.

It has now been found that compositions comprising an oxazolidine and a polyfunctional aliphatic or aromatic isocyanate will cure in the presence of moisture to give tough and useful polymeric materials. Many of these compositions can be stored in the absence of moisture without any significant reaction between the oxazolidine and the isocyanate.

A wide variety of oxazolidines can be used in the compositions of the invention, and any monofunctional or polyfunctional oxazolidine will generally be suitable. Generally, the oxazolidines used in the compositions of the invention will have no active hydrogen atoms. By active hydrogen atoms are meant the hydrogen atoms of groups, such as primary and secondary amino, carboxyl, and hydroxyl groups, which readily undergo reaction with electrophilic reagents, such as isocyanates. Compositions comprising oxazolidines having no active hydrogen atoms will generally have greater stability or "pot life" than compositions comprising oxazolidines which have active hydrogen atoms. However, oxazolidines which have active hydrogen atoms and compositions comprising other materials which have active hydrogen atoms can also be advantageously employed to give compositions which have adequate stability or improved curing speed over prior art materials as well as which will provide useful solid polymeric materials. In describing the compositions of the invention, the term "oxazolidine" is used to include both the five-membered ring oxazolidines and the six-membered ring tetrahydro oxazines, and to include compounds having one or more oxazolidine rings. Compounds having more than one oxazolidine ring are generally referred to herein as polyfunctional oxazolidines.

The oxazolidine substituents of the compounds useful in the compositions of the invention generally can be represented by the following formula:

(I)

wherein $R^1$ is a hydrogen atom, a phenyl group, a benzyl group, or a $(C_1$–$C_{12})$alkyl group, and
$R^2$ is a hydrogen atom or a $(C_1$–$C_4)$alkyl group, or
$R^1$ and $R^2$ can be taken together with the attached carbon atom to form a saturated five- or six-membered saturated carbon ring, and
Y is the radical

wherein
$n$ is 2 or 3, and
$R^3$ and $R^4$ are, individually, hydrogen atoms, $(C_1$–$C_{12})$alkyl groups, $(C_6$–$C_{10})$aryl groups, or $(C_1$–$C_{12})$aralkyl or alkaryl groups.

The groups represented by $R^1$, $R^2$, $R^3$, and $R^4$ can also have inert substituents, such as halogen atoms, alkoxy groups, nitro groups, and the like, and in some embodiments can also have active substituents, such as hydroxyl groups or amino groups.

Five tyeps of oxazolidines are among the preferred oxazolidines for the compositions of the invention—polyfunctional polyol ester oxazolidines, polyfunctional polycarboxylic ester oxazolidines, monofunctional ester oxazolidines, polymers and copolymers of oxazolidinylalkyl acrylates and methacrylates, as well as the simple aliphatic and aromatic mono- and bis-oxazolidines.

A preferred class of polyfunctional polyol ester oxazolidines has the general formula

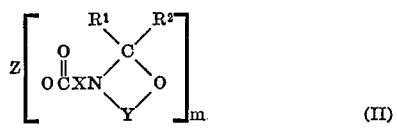

wherein $R^1$, $R^2$, and Y are as defined above,
m is an integer of two to four,
Z is an alkylene radical or a tri- or tetravalent hydrocarbon radical, and
X is the radical

wherein q is an integer of 2 to 4, and
$R^5$ and $R^6$ are individually selected from hydrogen and unsubstituted or substituted $(C_1-C_6)$ alkyl groups.

Compounds of Formula II can be produced by reacting an oxazolidine having ester functionality, prepared as described below, with a saturated or ethylenically unsaturated polyol which can contain aryl groups such as phenylene, etc., to effect the transesterification of the oxazolidine. The starting monofunctional oxazolidine used in the transesterification reaction can be produced in a Michael addition reaction wherein an oxazolidine having a hydrogen atom on the ring nitrogen atom is reacted with an ester of an $\alpha,\beta$-ethylenically unsaturated carboxylic acid to form the Michael addition product an oxazolidinyl alkanoate ester. Preferably an ester of acrylic or methacrylic acid will be used in the Michael addition, thus forming the propionate or isobutyrate ester. Alternatively, a primary alkanolamine is reacted with an ester of $\alpha,\beta$-ethylenically unsaturated carboxylic acid to form a Michael addition product. The Michael addition product is then further reacted with an appropriate carbonyl compound, such as an aldehyde or ketone, to produce a monofunctional oxazolidine having ester functionality. For example, when an acrylate ester is used as the starting material in the Michael addition reaction, the Michael addition product is $\alpha,\beta$-substituted propionate ester.

The novel intermediate oxazolidine formed by reacting the Michael addition product with the appropriate carbonyl compound has the general formula

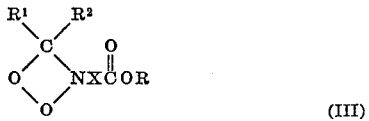

where R is a $(C_1-C_{18})$alkyl group, a $(C_3-C_{12})$cycloalkyl group, a $(C_6-C_{12})$aryl group, or a $(C_7-C_{15})$aralkyl or alkaryl group, and $R^1$, $R^2$, X and Y are as defined above. The monofunctional oxazolidines of Formula III also constitute one of the preferred classes of oxazolidines useful in the compositions of the invention.

The starting oxazolidine used in the transesterification reaction can also be prepared by allowing (1) an oxazolidine, (2) a compound capable of reacting as an oxazolidine, or (3) a compound capable of being converted under the reaction conditions to an oxazolidine to react with the appropriate ester of an unsaturated carboxylic acid, such as an ester of acrylic acid. For example, formaldehyde and ethanolamine react to form a product which may not be an oxazolidine but which is tautomeric with the oxazolidine, or a polymer thereof. This product reacts with esters of acrylic acid to form oxazolidinylpropionate esters. Isobutyraldehyde and ethanolamine react to form an equilibrium mixture of the oxazolidine and the hydroxyethylimine which on reaction with esters of acrylic acid also form oxazolidinylpropionate esters. As an alternative to providing compounds of Formula II by transesterification of simple oxazolidine esters with polyols, esters of acrylic acid with polyols can be reacted either with oxazolidines, or compounds capable of being converted to oxazolidines under the reaction conditions as indicated above for the simple esters. When the polyol employed in the transesterification is a phenolic compound, acid chlorides may advantageously be used to prepare the esters.

The transesterification reaction can, if desired, be catalyzed. Suitable catalysts include sodium salts of phenols, such as sodium phenoxide, p-hydroxyphenylamine, or a tetraalkyl titanate, such as tetraisopropyl or tetrabutyl titanate. If the reaction is carried out using a tetraalkyl titanate as the catalyst, about one-half percent to about ten percent, preferably one to five percent, by weight of the titanate based on the weight of the oxazolidine is used. No solvent is needed. The starting materials can be used in stoichiometrically equivalent amounts, or the ester can be used in an excess amount. The alcohol liberated during the transesterification can be removed by fractional or azeotropic distillation. The reaction is generally carried out at temperatures of about 50° to about 180° C. and the completion of the reaction can be determined by measuring the amount of alcohol removed. The theoretical amount of alcohol that should be liberated out of the system by distillation is readily calculated.

Basic metal hydroxides can also be used as the transesterification catalysts. They can be used in an amount of from about 0.2% to about 5% and preferably from about 1 to about 3% by weight based on the weight of the starting oxazolidine. Sodium methoxide or sodium ethoxide as well as the potassium ad lithium analogs can be used. An illustrative transesterification reaction would involve mixing of a starting oxazolidine and a polyol with a solution of the alkoxide in an alcohol such as methanol. The alkoxide solution can be added gradually to the polyol-oxazolidine mixture. No additional solvent is needed. The temperature may be from 50° to about 180° C. and preferably not over 160° C.

Representative of some of the oxazolidine esters of Formula II and Formula III are ethylene glycol bis-oxazolidinyl propionate, 1,4-butylene glycol bis-oxazolidinyl propionate, ethylene glycol bis-isopropyloxazolidinyl propionate, butylene glycol bis-isopropyloxazolidinyl propionate, trimethylolpropane tris-isopropyloxazolidinyl propinate, lauryl oxazolidinylpropionate, stearyl oxazolidinylpropionate, methyl oxazolidinylpropionate, methyl isopropyloxazolidinylpropionate, phenyl oxazolidinylpropionate, and pentaerylthritol tetra-isopropyloxazolidinyl propionate.

Representative polyols that may be used in the transesterification reaction are those which contain at least two hydroxyl groups and are substantially free from other functional groups containing active hydrogen. Illustrative polyols include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be used include glycerol, trimethylolethane, ethylene glycol, propylene glycol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside, rhammoside, and the like, and the polyethers prepared from such glycosides by reaction with ethylene oxide, propylene oxide, butylene oxide, or mixtures thereof, such as, for example, the alkylene oxide adduct of sucrose.

Further useful polyols are the mononuclear polyhydroxybenzenes such as resorcinol, pyrogallol, phloroglucinol, hydroquinone, 4,6-di-t-butylcatechol, catechol, resorcinol, methyl phloroglucinol, 2,5,6-trimethylresorcinol, 4-ethyl-5,6-dimethylresorcinol, n-hexylresorcinol, 4-chloro-5-methylresorcinol, and the like, fused ring systems such as 3-hydroxy-2-naphthol, 6,7-dihydroxy-1-naphthol, 2-hydroxy-1-naphthol, 2,5-dihydroxy-1-naphthol, 9,10 - dihydroxyanthracene, 2,3-dihydroxyphenanthrene, etc. and the polyethers prepared from these polyols by reaction with a 1,2-alkylene oxide such as ethylene, propylene, or butylene oxide.

Other polyols which can be employed are polynuclear hydroxybenzenes such as the various di-, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p-hydroxyphenyl)methane and the various diphenols and diphenylol methanes disclosed in U.S. Pat. 2,506,486, of Bender et al., granted May 2, 1950 and U.S. Pat. 2,744,882, of Bender et al., granted May 8, 1956, respectively.

Exemplary triphenylol compounds which can be employed include the alpha,alpha,omega, tris(hydroxyphenyl)alkanes such as 1,1,2-tris(hydroxyphenyl)ethanes;
1,1,3-tris(hydroxyphenyl)propanes;
1,1,3-tris(hydroxy-3-methylphenyl)propanes;
1,1,3-tris(dihydroxy-3-methylphenyl)propanes;
1,1,3-tris(hydroxy-2,4-dimethylphenyl)propanes;
1,1,3-tris(hydroxy-2,5-dimethylphenyl)propanes;
1,1,3-tris(hydroxy-2,6-dimethylphenyl)propanes;
1,1,4-tris(hydroxyphenyl)butanes;
1,1,4-tris(hydroxyphenyl)-2-ethylbutanes;
1,1,4-tris(dihydroxyphenyl)butanes;
1,1,5-tris(hydroxyphenyl)-3-methylpentanes;
1,1,8-tris(hydroxyphenyl)octanes;
1,1,10-tris(hydroxyphenyl)decanes, and the like.

Tetraphenylol compounds include the alpha,alpha, omega,omega, tetrakis(hydroxyphenyl)alkanes such as 1,1,2,2-tetrakis(hydroxyphenyl)ethanes;
1,1,3,3-tetrakis(hydroxy-3-methylphenyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)-2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimethylphenyl)octanes;
1,1,10,10-tetrakis(hydroxyphenyl)decanes;

and the corresponding compounds which contain substituent groups in the hydrocarbon chain such as 1,1,6,6-tetrakis(hydroxyphenyl)-2-hydroxyhexanes;
1,1,6,6-tetrakis(hydroxyphenyl)-2-hydroxy-5-methylhexanes;
1,1,7,7-tetrakis(hydroxyphenyl)-3-hydroxyheptanes;

and the like.

Further description of the polyfunctional polyol ester oxazolidines of Formula II and monofunctional oxazolidines of Formula III can be found in U.S. patent application Ser. No. 768,906, of W. D. Emmons and J. F. Levy, filed Oct. 18, 1968, now U.S. Pat. No .3,661,923, issued May 9, 1972.

A preferred class of polyfunctional polycarboxylic ester oxazolidines has the general formula

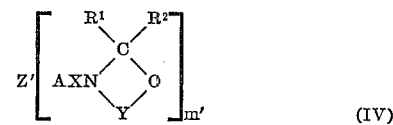

wherein $R^1$, $R^2$, X and Y are as defined above,
$m'$ is an integer of at least two, preferably two or three,
$Z'$ is a saturated, polyvalent, alkylene hydrocarbon radical, preferably having 1 to 38 carbon atoms, a phenylene group, a halo-substituted phenylene group, a ($C_1$–$C_8$)alkyl-substituted phenylene group, the divalent hydrocarbon residue of 1,1,3-trimethyl-5-carboxy-3-(p-carboxy phenyl)indane, a ($C_2$–$C_3$) unsaturated alkenyl divalent radical, or O=C<; and
A is

(the left valence being connected to the Z radical) or —O—, when $Z'$ is O=C<;

$Z'$ can be branched or straight-chain, and can be acyclic or contain a hydrocarbon ring.

Compounds of Formula IV can be produced by reacting a hydroxyl-terminated oxazolidine with an ester of a polybasic aliphatic or aromatic acid to effect the transesterification of the polyester. The monofunctional oxazolidine used as the transesterifying agent can be produced by reacting a secondary amine such as a secondary alkanolamine with an appropriate carbonyl compound such as an aldehyde or ketone to produce an N-hydroxyalkyloxazolidine which is a cyclic amino alcohol of the general formula

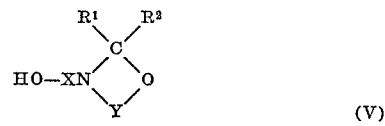

where X, $R^1$, $R^2$ and Y are as defined above.

The hydroxyalkyl compounds of Formula V used to react with the esters can be obtained by the reaction of a diethanolamine, a dipropanolamine, or similar di(hydroxyalkyl)amine with an aldehyde or ketone, particularly those listed below:

| | |
|---|---|
| Formaldehyde | Acetone. |
| Glyoxal | |
| Acetaldehyde | Methyl ethyl ketone. |
| Propionaldehyde | Methyl propyl ketone. |
| Butyraldehyde | Methyl isobutyl ketone. |
| Benzaldehyde | Methyl isopropyl ketone. |
| 2-ethylhexanal | |
| Cyclopentanone | Diisobutyl ketone. |
| Cyclohexanone | |

The preparation of the N-hydroxyalkyloxazolidines of Formula V is well known in the art. In general, they are prepared by reaction of the di(hydroxyalkyl)amines with the ketones or aldehydes in the bulk or within an inert solvent such as xylene, benzene, or toluene, adapted to form an azeotrope with the water to aid in its removal. The mixture is heated to a temperature of 100° C. or higher depending on the pressure in order to distill water.

The transesterification reaction can, if desired, be catalyzed. Suitable catalysts include sodium salts of phenols, such as sodium phenoxide, p-hydroxydiphenylamine, or a tetraalkyl titanate such as the tetraisopropyl or tetrabutyl titanate. If the reaction is carried out using a tetraalkyl titanate as the catalyst, about one-half percent to about ten percent, preferably one to five percent, by weight of the titanate based on the weight of the oxazolidine is used. No solvent is needed. The starting materials can be used in stoichiometrically equivalent amounts, although the ester can be used in an excess amount. The alcohol liberated during the transesterification may be removed by azeotropic distillation of a mixture of the alcohol and the starting monomeric polyester or by fractional distillation. If desired, a polymerization inhibitor can be employed such as p-hydroxydiphenyl amine or diphenyl-phenylenediamine. The reaction is generally carried out at temperatures of about 50° to about 180° C. and the completion of the reaction can be determined by measuring the amount of alcohol removed. The theoretical amount of alcohol that should be liberated out of the system by distillation is readily calculated.

An alkaline metal hydroxide can also be used as the transesterification catalyst, generally in the amount of from about 0.2% to about 5% and preferably from about 1 to about 3% by weight based on the weight of the starting oxazolidine. Sodium methoxide or sodium ethoxide as well as the potassium and lithium analogs can be used. An illustrative transesterification reaction would involve mixing of a starting oxazolidine and a polyester with a solution of the alkoxide in an alcohol, such as methanol. The alkoxide solution can be added gradually to the polyester-oxazolidine mixture. No additional solvent is needed. The temperature may be from 50° to about 180° C. and preferably not over 150° C.

In addition to the polyfunctional ester oxazolidines described above, certain carbonate diesters are within the scope of Formula IV. The carbonate diesters may be produced by a two-step transesterification process which involves (a) the preparation of the monoester by reacting an N-(2-hydroxyalkyl)oxazolidine with an excess of dimethyl carbonate and (b) reacting the monoester with excess oxazolidine in a suitable solvent, such as toluene, to produce the carbonate diester.

When Z' in Formula IV is a radical having ethylenic unsaturation, the polyfunctional ester oxazolidines are characterized by at least two points of reactivity. The first reactive site is the double bond in the Z' portion by means of which the compounds are adapted to polymerize by the typical vinyl addition process to form linear polymers and copolymers. The second point of reactivity is in the cyclic oxazolidinyl radical itself which is preferentially hydrolyzable, to give a difunctional intermediate. In the compounds of Formula IV, there are always at least two cyclic radicals, both of which are preferentially hydrolyzable.

Representative of some of the polyfunctional ester oxazolidines of Formula IV are bis-oxazolidinylethyl adipate, bis-oxazolidinylethyl phthalate, bis-oxazolidinylethyl terephthalate, bis-oxazolidinylethyl isophthalate, bis-isopropyloxazolidinylethyl adipate, bis-isopropyloxazolidinylethyl phthalate, bis-isopropyloxazolidinylethyl terephthalate, bis-isopropyloxazolidinylethyl isophthalate, and the bis-oxazolidinylethyl and bis-isopropyloxazolidinylethyl esters of 1,1,3-trimethyl-5-carboxy-3-(p-carboxyphenyl) indane.

The polyester starting material in the transesterification reaction can be derived from an appropriate polycarboxylic acid such as saturated dicarboxylic acids, for example, oxalic, malonic, succinic, methylmalonic, isosuccinic, glutaric, adipic, an unsaturated dicarboxylic acid, for example, itaconic, maleic, fumaric, α-methyleneglutaric, an aromatic dicarboxylic acid, for example, phthalic, terephthalic, isophthalic, tetrachlorophthalic, mellitic, pyromellitic and 1,1,3-trimethyl-5-carboxy-3-(p-carboxyphenyl)indane.

The unsaturated compounds of Formula IV can be copolymerized with various other ethylenically unsaturated monomers, and especially with various monoethylenically unsaturated monomers to produce linear copolymers. Thus, copolymers can be made containing from about ½% to 99.5% by weight of a compound of Formula IV with one or more of the following monomers: vinyl acetate, acrylonitrile, acrylamide, methacrylamide, styrene, halogen- or alkyl-substituted styrene, vinyltoluene, vinylidene chloride, vinyl chloride, vinyl laurate, esters of acrylic acid or methacrylic acid having from 1 to 18 carbon atoms in the alcohol moiety, such as methyl methacrylate, methyl acrylate, ethyl acrylate, butyl acrylate or methacrylate, cyclohexyl acrylate or methacrylate, 2-ethylhexyl acrylate or methacrylate, dodecyl acrylate or methacrylate, and octadecyl acrylate or methacrylate.

The polymers and copolymers of the compounds of Formula IV can be prepared by either a bulk, a solvent, or an aqueous emulsion technique using organic solvents such as acetone, dioxane, dimethylformamide, and acetonitrile, and azo catalysts such as diazodiisobutyronitrile and dimethyl-α,α'-azodiisobutyrate. The proportion of azo catalyst or initiator may be between 0.1% and 5% and is preferably between about 0.5% and 1.5%, on the weight of the total polymerizable materials.

Compounds having Formula IV in which $m'$ is one and $Z'$ is a saturated monovalent aliphatic or aromatic radical are also useful in making the compositions of the invention. Such compounds can be produced by the procedures described above by reacting an oxazolidine having Formula V with an ester of a monobasic aliphatic or aromatic acid, such as the lower alkyl esters of acetic acid, propionic acid, butyric acid, benzoic acid, and the like.

Further description of the polyfunctional polycarboxylic oxazolidines can be found in United States patent application Ser. No. 768,905, of W. D. Emmons, filed Oct. 18, 1968.

A third preferred class of polyfunctional oxazolidines are the polymers and copolymers of oxazolidinylalkyl acrylates and methacrylates having the formula

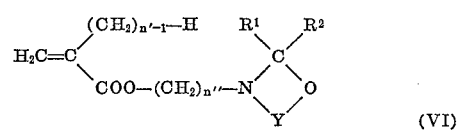

(VI)

wherein $R^1$, $R^2$, and Y are defined as above,
$n'$ is 1 or 2, and
$n''$ is 2 or 3.

The preparation of these polymers and copolymers is disclosed in U.S. Pat. 3,037,006, of E. M. Hankins and W. D. Emmons, granted May 29, 1962, which is incorporated herein by reference.

Another preferred class of oxazolidines embraces those derived from simple aliphatic and aromatic diamines, such as those having the formula

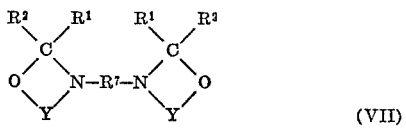

(VII)

wherein

R¹, R², and Y are as defined above, and

R⁷ is a divalent, saturated or unsaturated, alkylene radical, preferably having 1 to 38 carbon atoms, a divalent arylene radical, preferably having 6 to 18 carbon atoms, or a divalent aralkylene or alkarylene radical, preferably having 7 to 25 carbon atoms.

R⁷ can also have substituents such as nitro groups, halogen atoms, alkoxy groups, hydroxyl groups, or other groups which will not substantially interfere with the curing reaction, can be branched- or straight chain, and can be acyclic or contain a hydrocarbon ring.

Furthermore, oxazolidines derived from triamines, tetramines, and other polyamines are also useful in the invention. Such oxazolidines are also represented by the general formula

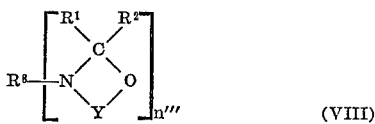

(VIII)

wherein R¹, R², and Y are as defined above, R⁸ is a polyvalent alkylene, arylene, aralkylene or alkarylene radical similar to R⁷ above, and n''' is an integer equal to the valence of R⁸.

Oxazolidines having Formula VII or Formula VIII are well known in the art. Generally, such compounds can be prepared from a polyamine by first reacting the amine with an alkylene oxide, such as ethylene oxide, propylene oxide, or related compound, to form the corresponding alkanolamine, followed by reaction with an aldehyde or ketone to form the oxazolidine compound. Other methods well known in the art can also be used in preparing these oxazolidines.

Examples of oxazolidines having Formula VII or Formula VIII include 1,2-bis(1,3-oxazolidin-3-yl)ethane,
1,8-bis(1,3-oxazolidin-3-yl)menthane,
bis[4-(3-oxazolidinyl)phenyl]methane,
bis(1,3-oxazolidin-3-yl)methane,
2-nitro-1,3-bis(1,3-oxazolidin-3-yl)propane and related compounds disclosed in U.S. Pat. 3,160,634, of Hodge, granted Dec. 8, 1964, 1,1-bis(1,3-tetrahydrooxazin-3-yl)methane,
bis(1,3-oxazolidin-3-yl)toluene,
bis(1,3-oxazolidin-3-yl)xylene,
1,6-bis(1,3-oxazolidin-3-yl)hexane,
1,12-bis(1,3-oxazolidin-3-yl)dodecane,
2,2,4-trimethyl-1,6-bis(1,3-oxazolidin-3-yl)hexane,
3,5,5-trimethyl-1-(1,3-oxazolidin-3-yl)-3-[(1,3-oxazolidin-3-yl)methyl]cyclohexane,
1,6-bis(1,3-oxazolidin-3-yl)hexene-3, and the like. Other oxazolidines can be prepared readily from other well known polyamines.

Furthermore, other types of oxazolidines which are well known in the art are also useful in the compositions of the invention. Included among these compounds are the dioxazolidines, such as 2,2'-bis(oxazolidine), 2,2'-bis(N-methyloxazolidine), and the like.

A wide variety of polyfunctional isocyanates, that is isocyanates having at least two —NCO groups, can be used in the compositions of the invention and substantially any isocyanate having two or more —NCO groups which will react with an oxazolidine in the presence of moisture can be used. The isocyanates which are used in the compositions of the invention are well known in the art.

Among the polyisocyanates which can be used in the compositions of the invention are aliphatic isocyanates such as 1,6-hexamethylene diisocyanate, 1,8-octamethylene diisocyanate, 1,12 - dodecamethylene diisocyanate, 2,2,4-trimethylhexamethylene diisocyanate, and similar alkylene diisocyanates, 3,3'-diisocyanatodipropyl ether, 3-isocyanatomethyl-3,5,5-trimethylcyclohexylisocyanate, cyclopentylene-1,3-diisocyanate, cyclohexylene-1,4-diisocyanate, methyl 2,6-diisocyanatocaproate, and related isocyanates, bis(2-isocyanatoethyl)fumarate, 4-methyl-1,3-diisocyanatocyclohexane, trans-vinylene diisocyanate and similar unsaturated isocyanates, 4,4'-methylene-bis(isocyanatocyclohexane), and related isocyanates, menthane diisocyanate, N,N',N''-tris(6-isocyanatohexamethylene)biuret, and related isocyanates, bis(2-isocyanatoethyl)carbonate, and similar carbonate diisocyanates, as well as other known isocyanates derived from aliphatic polyamines, aromatic isocyanates such as tolylene diisocyanates, xylylene diisocyanates, dianisidine diisocyanate, 4,4'-diphenylmethane diisocyanate, 1-ethoxy-2,4-diisocyanatobenzene, 1-chloro-2,4-diisocyanatobenzene, tris(4 - isocyanatophenyl)methane, naphthalene diisocyanates, fluorene diisocyanates, 4,4'-biphenyl diisocyanate; phenylene diisocyanates, 3,3'-dimethyl - 4,4' - biphenyl diisocyanate, p-isocyanatobenzyl isocyanate, tetrachloro-1,3-phenylene diisocyanate, and related isocyanates, 2,4,6-tribromo-1,3-phenylene diisocyanate, bis(2-isocyanatoethyl)benzene, vinyl polymers containing isocyanatoethyl methacrylate as a monomer or comonomer, prepolymers of polyisocyanates with polyhydroxyl or polyamino compounds, such as, prepolymers of 3-isocyanatomethyl - 3,3,5 - trimethylcyclohexylisocyanate, tolylene diisocyanate, menthane diisocyanate, 4,4'-methylene-bis(cyclohexylisocyanate), 4,4' - methylene-bis-(isocyanatocyclohexane), 2-isocyanatoethyl-6-isocyanatocaproate, and the like with polyether polyols, polyester polyols, and the like.

The preparation of the isocyanate prepolymers useful in the compositions of the invention is well known in the art. Generally, the preparation of these prepolymers involves the reaction of a polyol, polyether, hydroxyl-terminated polyester, polyester amide, or other polyfunctional active hydrogen compound, with a diisocyanate or other polyisocyanate, preferably using an excess of the isocyanate to yield an isocyanate-terminated prepolymer product. An extensive description of some of the useful techniques for preparing the isocyanate prepolymers can be found in J. H. Saunders and K. C. Frisch, Polyurethanes: Chemistry and Technology, Part II, Interscience (New York, 1964), especially on pages 8 to 49, and in the various references cited by Saunders and Frisch. Other preparative techniques which are known in the art can also be employed.

Other polyfunctional isocyanates which are useful in the compositions of the invention are disclosed in U.S. Pat. 3,162,664, of Brotherton et al., granted Dec. 22, 1964, U.S. Pat. 3,427,346, of Brotherton et al., granted Feb. 11, 1969, U.S. Pat. 3,275,679, of Brotherton et al., granted Sept. 27, 1966, U.S. Pat. 3,352,830, of Schmitt et al., granted Nov. 11, 1967, U.S. Pat. 2,729,666 of Stallmann, granted Jan. 3, 1956, U.S. Pat. 2,768,154 of Unruh et al., granted Oct. 23, 1956, U.S. Pat. 3,267,122 of Lehmann et al., granted Aug. 16, 1966, U.S. Pat. 3,281,378, of Garber et al., granted Oct. 25, 1966, U.S. Pat. 3,124,605, of Wagner, granted Mar. 10, 1964, U.S. Pat. 2,718,516, of Bortnick, granted Sept. 20, 1955, as well as isocyanates prepared from the amines disclosed in U.S. Pat. 3,256,-318, of Brotherton et al., granted June 14, 1966. Other isocyanates, such as those containing silicone and phosphorus can also be used in making the compositions of the invention.

An especially useful class of polyfunctional aliphatic isocyanates are the ester isocyanates represented by the formulas (a) 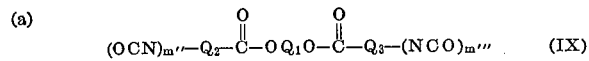

$$(OCN)_{m''}-Q_2-\overset{O}{\underset{\|}{C}}-OQ_1O-\overset{O}{\underset{\|}{C}}-Q_3-(NCO)_{m'''} \quad (IX)$$

(b) 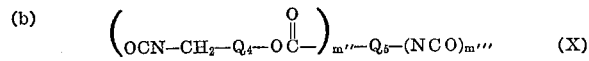

$$\left(OCN-CH_2-Q_4-O\overset{O}{\underset{\|}{C}}-\right)_{m''}-Q_5-(NCO)_{m'''} \quad (X)$$

and (c) 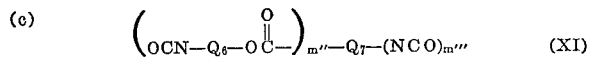

$$\left(OCN-Q_6-O\overset{O}{\underset{\|}{C}}-\right)_{m'''}-Q_7-(NCO)_{m'''} \quad (XI)$$

wherein $m''$ and $m'''$ are either one or two; $Q_1$ is the diester residue of an alkane or cycloalkane diol having two primary hydroxyl groups, preferably from 2 to 18 carbon atoms, and up to one hetero oxygen or sulfur atom; $Q_2$ and $Q_3$ are divalent alkylene radicals, preferably having 1 to 18 carbon atoms; $Q_4$ is an alkylene radical, preferably having 1 to 7 carbon atoms, and up to one hetero oxygen or sulfur atom; $Q_5$ is a divalent arylene or aralkylene radical, preferably having 6 to 18 carbon atoms; $Q_6$ is an alkylene radical, preferably having 2 to 8 carbon atoms, and up to one hetero oxygen or sulfur atom; and $Q_7$ is a divalent alkylene radical, preferably having 1 to 18 carbon atoms. As used herein, the term "alkylene" also includes "cycloalkylene."

The isocyanates of Formulas IX, X and XI are prepared by phosgenation of salts, preferably the hydrochlorides, of the corresponding amines. The amino groups of these amines are provided in whole or in part by an amino acid. The amino acids which are useful in preparing isocyanates of Formulas IX, X, and XI are the monoamino-monocarboxylic acids, the monoamino-dicarboxylic acids, the diamino-monocarboxylic acids, diamino-dicarboxylic acids and lactams having 3 to 12 carbon atoms in the ring. The amine hydrochlorides wherein the amino groups are provided in part by an amino acid are produced by reacting one or more of the designated class of amino acids as its acid salt with an alkanolamine hydrochloride. The amine hydrochlorides wherein the amino groups are provided wholly by an amino acid are produced by reacting a monoamino-monocarboxylic acid or a lactam with a dihydroxy alcohol (hereinafter referred to as "diols"), the amino groups being converted to an acid salt before the esterification reaction. In addition, compounds containing four amine hydrochloride groups are produced by reacting a diamino-monocarboxylic acid with a diol. Preferably these esterification reactions are carried out while passing a stream of hydrogen chloride gas through the reaction mixture while the esterification proceeds.

To produce the acyl-containing amine salts useful in preparing isocyanates of Formulas IX, X, and XI, the amino group or groups of the amino acid are first converted to an acid salt by reaction with a strong acid, preferably hydrochloric acid, and the resulting product is then reacted with an alkanolamine (also converted to a strong acid salt as the hydrochloride) or a diol in an inert liquid reaction medium. The amino acid and the diol or alkanolamine must have a significant solubility in each other under the reaction conditions or else the inert liquid used as the reaction medium must be a mutual solvent for these materials. The reaction temperature may be from about 40° C. to the temperature at which the amine acid salts present in the reaction mixture dissociate to form the free amine. Preferably the reaction is carried out at from about 50° C. to 180° C. Desirably an esterification catalyst is used to promote the reaction. Suitable catalysts include, for example, hydrogen chloride, chlorosulfonic acid, p-toluenesulfonic acid, and the like. In a preferred preparative technique, a stream of hydrogen chloride gas is passed through the reaction mixture while the reaction proceeds, in which case no separate catalyst for the esterification is needed. Means should be provided to distill off or otherwise remove the water formed during the esterification. The reaction may be carried out at sub-atmospheric or super-atmospheric pressures but preferably is carried out at atmospheric pressure. Liquid reaction media which may be used for the esterification include aromatic hydrocarbons, chlorinated aromatic hydrocarbons, chlorinated aliphatic hydrocarbons, chlorinated alicyclic hydrocarbons, tetramethylenesulfone, and other inert organic solvents. Where one of the reactants is a liquid or is molten under the reaction conditions, an excess of such reactant may be used as the reaction medium so long as the excess acts as an inert liquid so as not to cause polymerization or promote other undesirable side-reactions. In certain instances where the reaction product itself is a liquid under the reaction conditions, it apparently acts as the inert liquid, the initial esterification forming the first quantities of such product occurring in the presence of water (which is later distilled off as esterification proceeds) which is a solvent for the amine hydrochlorides.

When a lactam is used as the amino acid, desirably water (preferably about one mole per mole of lactam) is added along with a strong acid (preferably hydrochloric acid) to facilitate opening the ring. An undue excess of water is to be avoided since it must be removed during the esterification. The lactam may be first heated in contact with the water-acid mixture to open the ring, and then the diol or alkanolamine added along with an inert organic liquid and an azeotropic agent and the ester prepared as described above preferably using a stream of hydrogen chloride gas. Alternatively, all the reagents may be charged initially, the mixture heated without removal of water for a sufficient time to open the ring, and then the water is removed causing esterification to proceed. In this latter case, it is sometimes desirable to conduct the ring opening in a sealed pressure vessel under autogenous pressure. Other variations may also be used, as initially charging all the materials except the azeotropic agent which is added after ring opening. The use of water in this manner is not essential and good results have been obtained without its use.

The amine hydrochlorides produced in this manner may be converted to the corresponding isocyanates by reaction with phosgene or other carbonyl dihalide. Phosgene may be employed in either liquid or gaseous form. The amine hydrochloride is dispersed in an inert liquid reaction medium, phosgene added, preferably in excess of that needed to react quantitatively with the amino groups present, and the temperature of the reaction medium maintained at from about 100° C. to 225° C. The molar ratio of phosgene to amine hydrochloride group may be from about 1.1:1 to 10:1 and preferably is at least 2:1. Suitable liquid reaction media include aromatic hydrocarbons, chlorinated aromatic hydrocarbons, chlorinated aliphatic hydrocarbons, chlorinated alicyclic hydrocarbons, and other inert organic solvents. The phosgenation may also be carried out in steps. A purified amine hydrochloride can be used for the phosgenation or, if desired, the crude reaction product of the reaction between the amino acid and the alkanolamine hydrochloride or diol can be used.

The alkanolamines which are useful in preparing isocyanates of Formulas IX, X, and XI preferably contain from 2 to 8 carbon atoms, have one primary or secondary hydroxyl group and one primary amino group and may include one hetero oxygen or sulfur atom in the alkyl chain. The alkyl group of the alkanolamine can be substituted with inert substituent groups as alkyl, nitro, halogen, etc. Particularly preferred alkanolamines are ethanolamine, 2-(2-aminoethoxy)-ethanol, 1-amino-2-propanol, 2-amino-1-propanol, 2-methyl-2-amino-1-propanol, 3-amino-1-propanol and 2-amino-1-butanol. Mixtures of alkanolamines can be used.

The diols which can be used are those having two primary hydroxyl groups, preferably from 2-18 carbon atoms, and can be aliphatic, such as for example, alkane, alicyclic, such as for example, cycloalkane, or arenedialkyl. The diols can have a hetero oxygen or sulfur atom and can be substituted with inert substituent groups as alkyl, nitro, halogen, etc. Among the diols which can be used are the α,ω-aliphatic diols, p-bis(hydroxymethyl) cyclohexane, p-phenylenedimethylene diol, diethylene glycol, and the like. Mixtures of diols can be used.

The amino acids which can be used in preparing isocyanates of Formulas IX, X, and XI can be either optically active or inactive and include monoamino-monocarboxylic acids such as alanine, isoleucine, 3-aminobutyric acid, 3-aminopropionic acid, 3-amino-2-methyl propionic acid, phenyl alanine, p-aminobenzoic acid, methionine, ω-amino acids generally, etc.; monoamino-dicarboxylic acids such as aspartic acid and glutamic acid; diamino-monocarboxylic acids such as lysine and ornithine; diamino-dicarboxylic acids such as lanthionine; and lactams such as β-methyl-β-butyrolactam, α,β-dimethyl-butyrolactam, α,α',β-trimethylbutyrolactam, β-carbomethoxy-β-butyrolactam, β-phenyl-β-propiolactam, β-methyl-β-caprolactam, β-methyl-β-valerolactam, β-ethyl-β-valerolactam, 2-pyrrolidone, 6-methyl-2-piperidone, 3-methyl-caprolactam and 7-methyl-caprolactam. The amino acids can be substituted with inert substitutent groups as alkyl, nitro, halogens, and the like, and may contain one or more hetero atoms which do not interfere with the esterification reaction, and, where applicable, the subsequent phosgenation. Mixtures of amino acids may be used. The diaminomonocarboxylic acids disclosed in French Pat. 1,351,368 can also be used. Amino acids occur widely in nature and a number of synthesis methods are available for their production from inexpensive raw materials. Thus the addition of ammonia to an unsaturated acid may be used to produce inexpensive amino acids for use in the instant invention.

Further description of the preparation of the isocyanates of Formulas IX, X, and XI can be found in U.S. patent application Ser. No. 518,977, of W. D. Emmons and J. F. Levy, filed Jan. 6, 1966, now U.S. Pat. No. 3,567,763, issued Mar. 2, 1971.

The compositions of the invention are generally quite unreactive and are relatively stable in the absence of moisture. However, when the compositions come into contact with moisture, they are rapidly cured to tough, solid polymeric materials. Since water is the agent which effects the curing of the compositions, they are defined as hydrocurable compositions.

The reaction between the oxazolidine component and the isocyanate component of the composition can be initiated by atmospheric moisture. Even a trace amount of atmospheric moisture is generally sufficient to initiate the polymerization reaction and, thus, cure the composition. If desired, water may be added to the compositions to effect cure, but this is not necessary. It is believed that the polymeric materials formed from the compositions of the invention result from the rapid hydrolysis of the oxazolidine which opens the oxazolidine ring at one of the bonds to the oxygen atom. The following reaction sequence illustrates the postulated path of the hydrolysis:

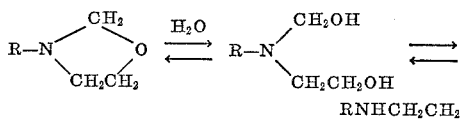

RNHCH$_2$CH$_2$OH + CH$_2$O

The aminoalcohol which is produced during the hydroylsis has two active hydrogen sites which will react rapidly with the isocyanate. Although the isocyanate can react with either the amino group or the hydroxyl group, it is believed that reaction preferentially occurs with the amino group. Since the isocyanate is polyfunctional and the oxazolidine reacts in the presence of water as a polyfunctional compound, their reaction as described above will produce a highly polymeric material. Of course, a compound having more than one oxazolidine group will react as a polyfunctional material even if the isocyanate and oxazolidine are present in such proportions as to cause primary reaction during cure with the amine functionality only. While the hydrocuring reaction, that is, the hydrolysis and ensuing polymerization, will normally occur rapidly at ambient temperatures, elevated temperatures may facilitate reaction and curing under some conditions.

The ratio of isocyanate to oxazolidine in the compositions of the invention is not critical and can be varied greatly to influence the nature and properties of the polymeric material which will be formed. For example, the isocyanate and oxazolidine can be present in ratios such that reaction during cure will primarily take place between the isocyanate and the amino group of the hydrolyzed oxazolidine. In general, the ratio of molar equivalents of isocyanate to oxazolidine in the compositions will be from about 1:10 to about 100:1, and the preferred ratio is from about 1:1.1 to about 2.5:1.

The hydrocuring reaction can be carried out with or without a catalyst. Under certain conditions, an acid catalyst, such as p-toluenesulfonic acid, dibutyltin octoate, zinc chloride, hydrogen chloride, or the like, may be advantageously employed. The acid catalyst will generally be present in an amount of from about 0.001% to about 10% by weight based on the weight of oxazolidine, and preferably from about 1% to about 5% by weight.

The compositions of the invention need not contain a solvent, but a suitable inert solvent can be added to the composition, if desired, either at the time of original formulation or at the time of use. The rates of the hydrolysis of the oxazolidine and the subsequent reaction with isocyanate can be influenced by the presence of a solvent. Solvents which are suitable for use in the compositions of the invention shoud be substantially free from active hydrogen atoms as determined by the Zerewitinoff method, described in Kohler et al., J. Am. Chem. Soc., 40, 2181-8 (1927), and should also be substantially anhydrous. Included among the solvents which can be used are toluene, xylene, liquid aliphatic hydrocarbons, isopropyl ether, ethyl acetate, β-ethoxyethyl acetate, methyl ethyl ketone, and the like, as well as mixtures of such solvents. Pigments, dyes, fillers, antioxidants and antiozodants, stabilizers, flow control agents, or other optional ingredients can also be included in the compositions of the invention.

The compositions of the invention can be used in forming films, fibers, paints, lacquers, varnishes, seamless flooring, caulks, and as coatings, impregnants, and adhesives for both natural and synthetic materials, such as paper, textiles, wood, plastics, metal, and leather, as binders for non-woven fabrics, and in a wide variety of other uses. To prepare coatings and films, the compositions of the invention can be applied with or without solvent by casting permanently or removably onto a suitable substrate.

The compositions of the invention provide an improved combination of increased pot life and increased curing speed with respect to those combinations which contain compounds having free amine groups.

Various embodiments of the compositions of the invention and the polymeric materials formed from them exhibit a number of desirable and advantageous properties. Some of the compositions can be sealed in a single package so that if moisture is excluded, undesirable thickening or gelling do not occur during storage. Even those compositions that are not extremely stable in one-pot formulations offer improved stability over conventional two-pot urethane systems. Since exposure to atmospheric moisture will effect cure, no additional materials need be mixed with these compositions at the time of use, thus facilitating greatly their handling. Furthermore, when no solvent is incorporated in the compositions, they are extremely high solids coating materials. When some of the compositions are used for the impregnation of leather, they provide significant improvements in break over known urethane systems.

The following examples will further illustrate this invention but are not intended to limit it in any way.

In the examples, especially in Tables I and II, the following designations are made for the various oxazolidines, isocyanates, and other additives and catalysts which are employed.

OXAZOLIDINES

| Designation | Name or composition [a] |
|---|---|
| I | bis[2-(1,3-oxazolidin-3-3-yl)ethyl]terephthalate. |
| II | bis[2-(1,3-oxazolidin-3-yl)ethyl]adipate. |
| III | bis[2-(1,3-oxazolidin-3-yl)ethyl]sebacate. |
| IV | bis[2-(2-isopropyl-1-3,oxazolidin-3-yl)ethyl]terephthalate. |
| V | bis[2-(2-isopropyl-1,3-oxazolidin-3-yl)ethyl]adipate. |
| VI | 1,4-[bis 3-(2-isopropyl-1,3-oxazolidin-3-yl)propionoxy]butane. |
| VII | bis{2-[2-(hept-3-yl)-1,3-oxazolidin-3-yl]ethyl}terephthalate |
| VIII | 2-(1,3-oxazolidin-3-yl)ethyl methacrylate. |
| IX | 2-(2-isopropyl-1,3-oxazolidin-3-yl)ethyl methacrylate. |
| X | Copolymer of methyl methacrylate/butyl acrylate/VIII=15/25/30/20/10, 48% solids in xylene. |
| XI | As X, but ratio of 40/0/30/20/10, 49% solids in xylene. |
| XII | As X, but ratio of 10/25/30/20/15, 48% solids in toluene. |
| XIII | As X, but ratio of 5/25/30/20/10, 48% solids in toluene. |
| XIV | N-ethyl-1,3-oxazolidine. |
| XV | 1,8-bis(1,3-oxazolidin-3-yl)menthane. |
| XVI | As X, but IX substituted for VIII, and ratio of 10/25/30/20/15, 48% solids in toluene. |
| XVII | As X, but ratio of 20/0/0/60/20, 40% solids in toluene. |
| XVIII | As X, but ratio of 20/20/0/40/20, 40% solids in toluene. |
| XIX | 1,2-bis(1,3-oxazolidine-3-yl)ethane. |
| XX | 2-(1,3-oxazolidin-3-yl)ethanol. |
| XXI | 2-(1,3-oxazolidin-3-yl)ethyl benzoate. |

[a] All parts by weight except where otherwise indicated.

ISOCYANATES [b]

| Designation | Name |
|---|---|
| A | 2-isocyanatoethyl 6-isocyanatocaproate. |
| B | 4,4'-methylene-bis(isocyanatocyclohexane). |
| C | 2,4-toluene diisocyanate. |
| D | 2-isocyanatoethyl methacrylate. |
| E | 3-isocyanatomethyl-3,5,5-trimethylcyclohexylisocycanate. |
| F | 2,2,4-trimethylhexamethylenediisocyanate. |
| G | 2-isocyanatoethyl 2-isocyanatopropionate. |
| H | Prepolymer from 1,4-butanediol and G, prepared at NCO/ON ratio of 2.0, at 50% solids in butyl acetate. |
| I | Prepolymer from 1,6-hexanediol and G, prepared at NCO/OH ratio of 2.0 at 75% solids in butyl acetate. |
| J | Prepolymer prepared from a pentaerythritol modified castor oil (commercially available as J. T. Baker's Castor DB-oil) (39.5 parts) and isocyanate G (60.5 parts) at 75% solids in toluene. |

ISOCYANATES [b]

| Designation | Name |
|---|---|
| K | Prepolymer from 475 parts of a 425 molecular weight polypropyleneglycol, 422 parts of isocyanate E, 897 parts of xylene and 0.10 part of catalyst CC. |
| L | Prepolymer from 300 parts of a 425 molecular weight polypropyleneglycol, 97 parts of dipropylene glycol, 547 parts of isocyanate E, 944 parts of xylene and 0.09 parts of catalyst CC. |
| M | Prepolymer from 216 parts of B and 100 parts of a 400 molecular weight triol prepared by reacting trimethylolpropane with 1,2-propylene oxide, the prepolymer prepared with 316 parts of toluene solvent. |
| N | Prepolymer from a polyester polyol (prepared from adipic acid, ethylene glycol and propylene glycol in the ratio of 1.0/0.88/0.22, polyester OH number 60) and isocyanate C at an NCO/OH ratio of 1.7. |
| O | As N, but prepolymer prepared at an NCO/OH ratio of 2.0. |
| P | Copolymer of diethyl α-methyleneglutarate/isocyanate D=25/75 as an 80% solution in isocyanate A. |
| Q | Prepolymer prepared from 300 parts of a polypropylene glycol of molecular weight 425, 94.7 parts of dipropylene glycol, 537 parts of isocyanate E, 923 parts of xylene and 0.1 part of catalyst CC. |
| R | 500 parts of a polypropylene glycol of molecular weight 425, 444 parts of isocyanate E, 944 parts of xylene and 0.1 part of catalyst CC. |
| S | Desmodur N, commercially available from Mobay Chemical Co., and believed to be a biuret trisocyanate prepared from the reaction of hexamethylene diisocyanate and water, supplied as a 75% solution. |
| T | Prepolymer prepared from Castor DB oil (J. T. Baker Co.) (100 parts) toluene diisocyanate (46.1 parts) at 100% solids, isocyanate content 1.58 meq./g. content 1.4 meq./gram. |
| U | Prepolymer prepared from isocyanate E and a 450 molecular weight polypropylene glycol at an NCO/OH ratio of 1.7, at 48.6% solids in xylene. |
| V | Prepolymer prepared from isocyanate E and a 740 molecular weight propylene oxide adduct of trimethylolpropane at an NCO/OH ratio of 2.25, at 70% solids in xylene. |
| W | A urethane prepolymer, commercially available from Stahl Finish Co., under the name Titekote. |

[b] All parts by weight except where indicated. NCO/OH ratios are ratios of equivalents of isocyanate to those of hydroxyl groups.

OTHER ADDITIVES AND CATALYSTS

| Designation | Name |
|---|---|
| AA | Copolymer of styrene/butyl acrylate/hydroxypropyl methacrylate (1,2)/methacrylic acid=28/40/29.2/2.8, 60% solids in Solvesso 100. |
| BB | Copolymer of methyl methacrylate/styrene/butyl methacrylate/hydroxypropyl methacrylate/methacrylic acid=10/25/30/22.5/12.5 50% solids isobutyl acetate. |
| CC | Dibutyltin dilaurate. |
| DD | Dibutyltin di-2-ethylhexoate. |
| EE | Stannous 2-ethylhexoate. |
| FF | Zinc 2-ethylhexoate. |
| GG | p-Toluenesulfonic acid. |

EXAMPLES 1 TO 5

In the following examples, an isocyanate and an oxazolidine were mixed at a ratio of two equivalents of isocyanate to one equivalent of oxazolidine and were cast as films having a thickness of 1.5–2.0 mils on cold rolled steel panels. The results are summarized in Table I.

TABLE I

| Example number | Oxazolidine | Isocyanate | Stability (days[a]) | Tack-free time (min.[b]) | Tukon hardness, KHN (1 week) | Max. flexibility | Reverse impact (pounds) |
|---|---|---|---|---|---|---|---|
| 1 | V | A | >120 | 600 | <0.5 | $T_0$ | >50 |
| 2 | VI | A | >120 | 600 | <0.5 | $T_0$ | >50 |
| 3 | IV | A | >365 | >480 | 12.6 | $T_0$ | >50 |
| 4 | IV | S | >70 | >480 | 13.7 | 1/8" | <10 |
| 5 | IV | S+0.05% DD | >70 | 180 | 12.6 | 1/8" | <10 |

[a] For sample protected from atmospheric moisture.
[b] For film (1½–2 mils) exposed to atmospheric moisture.

EXAMPLES 6 TO 48

In the following examples, an isocyanate and an oxazolidine were mixed at a ratio of two equivalents of isocyanate to one equivalent of oxazolidine (unless otherwise noted) and were cast as films having a thickness of 1.5 to 2.0 mils on glass plates or cold rolled steel panels for hardness tests and on chromate treated aluminum or cold rolled steel for flexibility and reverse impact tests. In some of the examples, those marked with an asterisk, an inert solvent, such as xylene, toluene, or butyl acetate, was added to facilitate casting of the films. Other materials were added to some of the compositions to evaluate their effect on the properties of the systems. In Table II, the percent additive or catalyst is calculated as percent of additive solids on total solids. The results of these tests are summarized in Table II.

ture or (2) 30 minutes in 0.5% Tide (a commercial built sulfonate detergent) solution at 180° F.

Peel strength of 37 oz./inch strip was obtained for the dry laminate and values of 51 and 41 oz./inch, respectively, for aqueous and solvent wet peel strengths.

EXAMPLE 50

Another adhesive system applied by the procedure of Example 49 consisted of the addition of 0.31 part of oxazolidine XIX to 25 parts of isocyanate prepolymer O at 100% solids.

A cotton broadcloth/cotton broadcloth laminate gave peel strength values of 35, 53, and 49 oz./inch strip, respectively, for initial dry peel strength and wet peel strength after soaking in Tide solution at 180° F. and in perchloroethylene at room temperature.

TABLE II

| Example number | Isocyanate | Oxazolidine | Catalyst or additive | Tukon hardness [a] 1 week air cure | Tukon hardness [a] 3 hr. cure at 140° F. | Flexibility [b] | Reverse impact (pounds) | Tack-free time (minutes) |
|---|---|---|---|---|---|---|---|---|
| 6* | A | I | | (17.3) | | ($T_0$) | (>50) | 360 |
| 7 | A | II | | (Elastic) | | | (>50) | 345 |
| 8 | A | XXI | | (0.97) | | (F 1/4") | (<2) | 1,200 |
| 9 | A | III | | (<.5) | | (1/8") | (>50) | 120 |
| 10* | H | I | | | | ($T_0$) | (>50) | 75 |
| 11* | I | I | | (1.2) | | ($T_0$) | (>50) | 56 |
| 12* | A | X | | 2.6 | 10.8 | $T_0$ | <10 | |
| 13* | A | XI | | 1.8 | 9.6 | $T_0$ | <10 | |
| 14 | A | IV | | 4.4 | 7.8 | $T_0$ | >50 | 600 |
| 15 | A | IV | 5% AA | 4.4 | 5.1 | $T_0$ | >50 | 960 |
| 16 | A | IV | 25% AA | 1.4 | 2.2 | $T_0$ | >50 | 960 |
| 17c | A | XIII | | 9.3 | | $T_3$ | 20-30 | 30 |
| 18 | A | IV | 5% BB | 10.0 | 2.9 | $T_0$ | <10 | 240 |
| 19 | A | IV | 50% BB | 3.3 | 4.5 | $T_0$ | <10 | 30 |
| 20c | A | XII | | 10.1 | | $T_3$ | 30-40 | 30 |
| 21* | J | IV | | 10.0 | 8.3 | $T_0$ | >50 | 60 |
| 22* | J+A[d] | IV | | 12.5 | 5.5 | $T_0$ | >50 | 75 |
| 23* | J+A[e] | IV | | 15.3 | 3.3 | $T_0$ | >50 | 120 |
| 24* | B | XII | | 9.9 | 13.1 | F 1/8" | <10 | |
| 25* | B | XIII | | 11.0 | 14.0 | F 1/8" | <10 | |
| 26 | A | V | | <0.5 | <0.5 | $T_0$ | >50 | 600 |
| 27 | A | VI | | <.5 | <.5 | $T_0$ | >50 | 600 |
| 28 | A | VII | | .7 | .7 | $T_0$ | >50 | 2,400 |
| 29 | A | IV | | .7 | .9 | $T_0$ | >50 | >160 |
| 30* | A | XVI | | | 8.1 | $T_1$ | 15 | 30 |
| 31* | E | XVIII | | 7.2 | 6.5 | | 30 | |
| 32* | K | XVII | | 1.3 | | | 50 | |
| 33* | F | XVIII | | 2.2 | 2.1 | | 40 | |
| 34* | L | XVIII | | 8.8 | | | 30-35 | |
| 35 | A | IV | 0.22% FF | 0.6 | 0.8 | | | 60 |
| 36 | A | IV | .10% CC | 1.5 | 1.2 | | | 60 |
| 37 | A | IV | .06% EE | 4.0 | 8.8 | | | 600 |
| 38 | A | IV | .12% EE | 3.7 | 6.1 | | | 180 |
| 39 | A | IV | .24% EE | 5.1 | 7.4 | | | 105 |
| 40 | A | IV | .08% DD | 0.7 | 0.8 | | | 45 |
| 41 | A | IV | .02% DD | 5.4 | 3.6 | | | 120 |
| 42* | S | XVII | | 4.4 | | | | 35 |
| 43* | S | XVIII | | 11.8 | | | | 25 |
| 44 | C | XIV | | | | | | 5 |
| 45 | C[f] | V | | | | | | 60 |
| 46 | C | V | | | | | | 100 |
| 47 | C | | | | | | | >180 |
| 48 | A | IV | 0.5% GG | 13.5 | | $T_0$ | >50 | 480 |

[a] Hardness measurements made on coated glass plates, except for values in parenthesis which were obtained over a cold rolled steel substrate.
[b] Flexibility and reverse impact were determined on chromate treated aluminum except for values in parenthesis which were obtained over cold rolled steel.
[c] Pigmented systems: pigment (titanium dioxide) ground into oxazolidine, then isocyanate added. Pigment level 40%, binder 60% (on total solids).
[d] Two equivalents of isocyanate from A plus one equivalent of isocyanate from J used per equivalent of oxazolidine (NCO/oxazolidine ratio=3/1).
[e] Two equivalents of isocyanate from A plus 0.5 equivalent of isocyanate from J used per equivalent of oxazolidine (NCO/oxazolidine ratio=2.5/1).
[f] NCO/oxazolidine ratio=1.0.

EXAMPLE 49

To 24.1 grams of isocyanate prepolymer N, formulated as an 82% solution in methyl chloroform solvent, was added 0.4 gram of oxazolidine II.

A cotton broadcloth/cotton broadcloth laminate was made by applying this adhesive in a dot pattern to one of the pieces of fabric. The second fabric was pressed onto the adhesive side of the first fabric to form the laminate, dried for 1 minute at 220° F., and then conditioned at 65% relative humidity and 72° F. for 24 hours. Resin add-on was approximately 0.15 oz./yd.$^2$.

Laminates were cut into 1" x 6" strips and tested on a Thewing-Albert Tester for initial dry peel strength and wet peel strength after soaking the laminate (1) 20 minutes in perchloroethylene solution at room tempera-

EXAMPLE 51

Following the procedures of Example 49 1.0 part of oxazolidine XX was added to 50 parts of isocyanate prepolymer N, the prepolymer formulated as an 82% solution in methyl chloroform, and 29.2 parts of a cellulose acetate propionate solution (15% in methylene dichloride). Preparation of a cotton broad cloth/cotton broadcloth laminate as described in Example 49 in an initial dry peel strength of 65 oz./inch strip and values of 27 and 51 oz./inch strip, respectively, for aqueous and perchloroethylene wet peel strength.

EXAMPLES 52–54

A prepolymer was prepared by reacting 100 parts of a 1,2-propylene oxide reaction product of trimethylolpropane, molecular weight approximately 400, with 216 parts of isocyanate B and 316 g. of toluene. The solution is designated isocyanate M.

In Example 52, 48.1 g. of isocyanate M was mixed with 3 g. of oxazolidine XX, in Example 53, 24.1 g. of isocyanate M was mixed with 3 g. of oxazolidine II, and in Example 54, 22.7 g. of isocyanate M was mixed with 3 g. of oxazolidine I.

Table III summarizes the properties of 1 mil films prepared from the above compositions.

TABLE III

| Example: | Gardner-Holdt viscosity at 25° of mixture | | Tack-free time | Tukon hardness after air cure for— | |
|---|---|---|---|---|---|
| | Initially | After 10 days | | 10 days | 20 days |
| 52 | A–3 | A | 2 hr. | 15.5 | 15.3 |
| 53 | A | B | 1 hr. | 13.2 | 13.6 |
| 54 | B | B+ | 1 hr. | 11.4 | 10.9 |

EXAMPLE 55

A prepolymer was prepared by reacting 103.5 g. of poly[ethylenepropylene adipate] with 21.5 g. of isocyanate E in 25 g. of 1,1,1-trichloroethane using 4.0 mg. of dibutyltin dilaurate as a catalyst. To 11.0 g. of this prepolymer was added 0.10 g. of oxazolidine XIX, prepared as in Example 56, in 10 g. of 1,1,1-trichloroethane; 10 mil films were cast of the prepolymer and the above mixture with oxazolidine. After 3 days of exposure to atmospheric moisture the mixture was completely reacted forming an elastic film while the prepolymer by itself took 30 days to form an elastic film mixture. The isocyanate/oxazolidine mixture stored in a tightly sealed bottle did not change in viscosity after 3 days.

EXAMPLE 56

Preparation of oxazolidine XIX

To a 2-l., 3-neck flask fitted with a condenser, mechanical stirrer, thermometer and an addition funnel containing 305 g. of ethanolamine was charged 99 g. of 1,2 dichloroethane. While stirring at 80° C., the ethanolamine was added slowly over a 1 hour period causing an exotherm to 125° C. After the addition was complete, the temperature was held at 125° C. for 3 hours. One hundred seventy-five g. of 50% sodium hydroxide was added while stirring and the mixture was stripped of water and excess ethanolamine at reduced pressure (20 mm.) to a pot temperature of 175° C. The residue was cooled to 25° C. at 20 mm. After releasing the vacuum, 200 ml. of benzene was added and while stirring the slurry, 75 g. of paraformaldehyde (95%) was added. The temperature was raised to 80° C., gradually removing 50 ml. of azeotrope collected in a Dean-Stark trap. The mixture was filtered, stripped of solvent, and distilled at reduced pressure yielding 87 g. of a pale yellow liquid, 1,2-bis(1,3-oxazolidin-3-yl)ethane, B.P. 90° C. at 0.5 mm. $n_d^{25}$ 1,4836.

Elemental analysis. Calc. for $C_8H_{16}N_2O_2$ (percent): C, 55.8; H, 9.3; N, 16.3. Found (percent): C, 56.6; H, 8.82; N, 16.2.

EXAMPLE 57

This example shows the utility of isocyanate/oxazolidine compositions when applied over a visibly wet surface. The substrate for this example is a paper blotter.

A prepolymer was prepared from J. T. Baker Co. DB-castor oil, hydroxyl number 165 (100 parts), and toluene diisocyanate (46.1 parts) by heating the two together. The isocyanate content as indicated by the butylamine method was 1.58 meq./gram. This is designated at isocyanate T.

Films were prepared on a wet blotter and on a dry blotter after mixing one equivalent of oxazolidine II (one oxazolidine group) with approximately a 10° percent excess of isocyanate T (1.1 isocyanate groups), and then allowing the mixture to cure on the blotter at room temperature. It was found that the film prepared on the wet blotter had a faster curing time, with fewer bubbles, than the film prepared on the dry blotter. Furthermore, almost all of the polymeric material stayed on the surface of the wet blotter as a film, with only slight penetration of the polymer into the blotter.

EXAMPLE 58

Impregnans for leather

Oxazolidines were mixed with urethane prepolymers at a ratio of one isocyanate group to one oxazolidine group, and final solids were adjusted to 15–20% in Solvesso 100 solution.

Samples were applied to vegetable retanned unimpregnated moccasin leather (P&V Playshu) at 3.1 to 3.6 gm. of solids per sq. ft. using a swabbing technique. Samples were also applied in a two-step process in which a solution of the oxazolidine was applied first, the solvent allowed to evaporate, and then the isocyanate prepolymer was applied to give the same total add-on as in the first technique.

After the solvent had evaporated the samples were coated (three applications) with a black-pigmented acrylic basecoat to facilitate evaluations of break characteristics. Finally the samples were plated at 200° F. on a Watson-Stillman press for three seconds at 450 lbs./in.$^2$ within 24–36 hours after impregnation.

Evaluation of break was made by side by side comparison with unimpregnated moccasin controls and a control using isocyanate W by itself with no oxazolidine. Table IV summarizes the results of these evaluations, in which ratings of 1 (much better than), 2 (moderately better than), and 3 (slightly better than or equal to the control) were given.

TABLE IV

| Experimental system | | Break improvement compared to— | |
|---|---|---|---|
| Isocyanate | Oxazolidine | Unimpregnated control | Titekote control |
| U | V | 1 | 3 |
| W | V | 1 | 3 |
| W | V | 1 | 2 |
| W | V | 1 | 3 |
| W | V | 1 | 2 |
| W | XVII | 1 | 2 |
| W | II | 1 | 2 |
| W | XIX | 1 | 2 |
| W [1] | V | 1 | 2 |

[1] Leather first treated with oxazolidine, dried, then treated with isocyanate.

The above data indicates the effectiveness of the isocyanate-oxazolidine compositions as impregnants for leather.

EXAMPLE 59

Leather topcoats from isocyanate-oxazolidine compositions

This example shows the utility of the isocyanate-oxazolidine compositions when applied as leather topcoats. The following compositions were prepared:

A prepolymer was made from a polyether triol derived from the addition of propylene oxide to trimethylol propane (molecular weight 740) and diisocyanate E at an NCO/OH ratio of 2.25. The prepolymer was blended with oxazolidine XVIII at an NCO/oxazolidine ratio of 2.0 (ratio of equivalents of iscocyanate to equivalents of oxazolidine).

EXAMPLE 60

The same prepolymer as Example 59 was blended with oxazolidine XVII at an NCO/oxazolidine ratio of 2.0.

EXAMPLE 61

A prepolymer was made from a polyester polyol (derived from 1.02 equivalents of adipic acid, 1.02 equivalents of phthalic acid, 2.18 equivalents of 1,3-butyleneglycol and 0.10 equivalent of trimethylol ethane) and diisocyanate E at an NCO/OH ratio of 2.4. This was then blended with oxazolidine XVII at an NCO/oxazolidine ratio of 2.0.

EXAMPLE 62

The polyether triol of Example 59 was reacted with diisocyanate B at an NCO/OH ratio of 2.25. The prepolymer formed was blended with oxazolidine XVIII at an NCO/oxazolidine ratio of 2.0.

EXAMPLE 63

A prepolymer was prepared from 1.7 equivalents of diisocyanate E, 0.65 equivalents of polypropylene glycol 400 and 0.35 equivalents of dipropylene glycol. This was partially reacted with oxazolidine XX at an NCO/oxazolidine ration of 2.3.

Each of the above blends of prepolymer/oxazolidine compound was made into a coating using the general formula.

| | |
|---|---|
| Prepolymer/oxazolidine mixture ____gm. solids__ | 5.7 |
| Silica based dulling agent _____do____ | 5.7 |
| Dow 160 silicone fluid _____ | 0.2 |
| Dibutyltin dilaurate _____ | 0.057 |
| 1:1 toluene/methyl isobutyl ketone to make a total of 100 gm. | |

The formulated coatings were applied by air spray at the rate of 1.0 to 1.2 gm./ft.$^2$ to basecoated upholstery and shoe side upper leather and at a rate of 0.1–0.16 gm./ft.$^2$ to commercially basecoated poromeric leather substitute.

The composition of Example 59 formulated into a topcoat without the addition of silica dulling agent gave a deep luster patent leather type finish on shoe upper leather with outstanding abrasion resistance.

The compositions of Example 59 and Example 63 formulated into a topcoat and applied as topcoats to a poromeric leather substitute (commercially available as Du Pont's Corfam, basecoated with an acrylic basecoat) showed excellent abrasion resistance.

The compositions of Examples 59, 60, 61, 62, and 63 were formulated into a topcoat and applied to basecoated upholstery leather. The welt rub abrasion resistance of these systems is shown in the Table V.

TABLE V

| Top coat example: | Welt rub resistance [1] |
|---|---|
| 59 | [2] 5000 |
| 60 | [2] 1000 |
| 61 | 1000 |
| 62 | [2] 1000 |
| 63 | 1000 |

[1] No. of cycles to failure on Wyzenbeck abrasion tester.

The above data show the improved abrasion resistance and welt rub resistance imparted to leather by finishes made from the isocyanate-oxazolidine systems of the invention.

EXAMPLE 64

Preparation of oxazolidine XV

To a solution of 85.0 g. (0.50 mole) 1,8-diamino-p-menthane in 37 g. (2.06 moles) deionized water at 34° C. was added 44.0 g. (1.0 mole) ethylene oxide over 1.25 hours; the temperature rose to 79° C. and brief cooling to 70° C. was employed. The solution was stirred for 0.5 hour as the temperature dropped to 35° C., then heated to reflux for 2.5 hours. Then 50 ml. of benzene was added, the mixture was refluxed, and 31 ml. of water was collected. A solid which deposited in the solution was collected by filtration, washed with benzene, and dried to obtain in two crops 47.3 g. of N,N'-bis(2-hydroxyethyl)-1,8-diamino-p-menthane.

A mixture of 14.8 g. (0.470 mole) 95% paraformaldehyde, 57.8 g. (0.224 mole) N,N'-bis(2-hydroxyethyl)-1,8-diamino-p-menthane, and 100 ml. of benzene was heated to reflux and 8.6 ml. of water was collected over a period of about 2 hours. The benzene was removed by distillation on a rotary evaporator at reduced pressure, and the 58 g. (92% crude yield) residue was subjected to straight-line distillation under reduced pressure. Distillation gave a total of 52.2 g. (83%) of 1,8-bis(1,3-oxazolidin-3-yl)-p-menthane as a clear viscous oil, B.P. 103–140° (0.5 mm.), in four fractions. The fourth fraction had $n_D^{26} = 1.5040$, titrimetric (HClO$_4$/HOAc) purity was 99.8% and the oil, the bis-oxazolidine, crystallized with M.P. 62–64° C.

*Analysis.*—Calc'd for $C_{26}H_{30}N_2O_2$ (percent): C, 68.05; H, 10.71; N, 9.96. Found (percent): C, 68.32; H, 10.66; N, 9.36.

EXAMPLE 65

Coating from 1,8-bis(3-oxazolidinyl)-p-methane and 2-isocyanatoethyl 6-isocyanatocaproate A mixture of 7.06 g. (0.025 mole) of 1,8-bis(3-oxazolidinyl)-p-menthane, prepared as in Example 64, and 11.3 g. (0.05 mole) of 2-isocyanatoethyl 6-isocyanatocaproate was prepared. The blend was placed in Gardner-Holdt viscosity tubes at 25° and 60° C. and thin films were deposited on glass panels at 25° C. in the air and 60° in a forced-draft oven. The Gardner-Holdt viscosity at 25° was initially A–3 and was unchanged after 22 hours. The film at 25° was originally tacky, and cured to a hard tack-free film in 22 hours. The Gardner-Holdt viscosity at 60° changed slightly from A–4 to A–2 in 22 hours, while the 60° film was hard and tack-free after 22 hours.

EXAMPLE 66

1,6-bis(2-isopropyl-5-methyl-3-oxazolidinyl) hexane

A solution of 56.1 g. (0.25 mole) N,N'-bis(isobutylidene) hexane-1,5-diamine, 31.9 g. (0.55 mole) propylene oxide, and 100 ml. carbon tetrachloride was prepared and cooled to 50° C. A solution of 6.5 g. (0.025 mole) stannic chloride in 50 ml. carbon tetrachloride was added over a 0.5 hour period. An exotherm gradually occurred to 90° C. after the addition. The mixture was cooled to 10° C., then stirred at 25° C. for 4 hours. After refrigeration for about 64 hours, the solvent was removed by distillation on a rotary evaporator, and the remaining liquid was distilled under reduced pressure using a 6-inch Vigreux column. The product was collected in three fractions, 19.0 g. (22.4% yield) clear yellow liquid B.P. 165–171° C. (0.75 min.). Titrimetric (HClO$_4$/HOAc) purity of the first fraction (forerun discarded) was 99%.

*Analysis.*—Calc'd for $C_{20}H_{20}N_2O_2$ (percent): C, 70.54; H, 11.84; N, 8.23. Found (percent): C, 70.33; H, 11.92; N, 8.10.

EXAMPLE 67

Coating from 1,6-bis(2-isopropyl - 5 - methyl-3-oxazolidinyl)hexane and 2-isocyanatoethyl 6-isocyanatocaproate A blend of 5.10 g. (0.03 mole) of 1,6-bis(2-isopropyl-5-methyl-3-oxazolidinyl) hexane, prepared as in Example 66, and 6.78 g. (0.06 mole 2-isocyanatoethyl 6-isocyanatocaproate was prepared. A thin film of this blend was prepared on a glass panel at 25° C.; the film was initially tacky and cured to a hard tack-free film in 24 hours.

EXAMPLE 68

Coating from bis[2-(2-isopropyl-3-oxazolidinyl) ethyl] terephthalate and toluene-2,4-diisocyanate A blend of 2.24 g. (0.005 mole) bis[2-(2-isopropyl-3-oxazolidinyl)ethyl] terephthalate and 1.64 g. (0.01 mole) toluene-2,4-diisocyanate was prepared, placed in Gardner-Holdt viscosity tubes and a thin film was prepared on a glass panel at 25° C. The thin film originally tacky, cured to a hard tack-free film in 24 hours. The Gardner-Holdt viscosity was originally A–1 and was unchanged after 24 hours; the viscosity progressed to B in 8 days.

EXAMPLE 69

Preparation of 2,2'-bis(N-methyloxazolidine)

To a solution of 157.7 g. (2.1 moles) 2-methylaminoethanol in 150 ml. of benzene was added 145.1 g. (1.0 mole) 40% aqueous glyoxal solution. A mild exotherm occurred and the mixture was cooled briefly in an ice bath, then heated to reflux and 101 ml. of water was collected over 4.17 hours. The reaction mixture was decanted away from a dark residue, and after standing overnight light-brown crystals were deposited. These crystals were collected in two crops to give 156 g. (90.7% yield) of 2,2'-bis(N-methyloxazolidine). Recrystallization from diethyl ether gave white crystals having a M.P. 77–77.5° C., gas-liquid chromatography purity 100%, and titrimetric ($HClO_4/HOAc$) purity 99.5%.

*Analysis.*—Calc'd for $C_8H_{16}N_2O_2$ (percent): C, 55.79; H, 9.36; N, 16.27. Found (percent): C, 56.29; H, 9.47; N, 15.52.

EXAMPLE 70

Coating from 2,2'-bis(N-methyloxazolidine) and 2-isocyanatoethyl 6-isocyanatocaproate A blend of 8.61 g. (0.05 mole) 2,2'-bis(N-methyloxazolidine), prepared as in Example 69, and 22.62 g. (0.10 mole) 2-isocyanatoethyl 6-isocyanatocaproate was prepared (slight warming required). The blend was placed in Gardner-Holdt viscosity tube at 60° C. and a thin film was deposited on glass panels and placed in a 60° C. forced-draft oven to cure. The Gardner-Holdt viscosity of the sample at 60° C. remained at the initial A–3 viscosity, and the thin film, initially tacky, cured to a hard tack-free film in 7 hours.

EXAMPLE 71

Isocyanate-oxazolidine compositions as varnishes

Mixtures of oxazolidine IV and isocyanate A were mixed at an isocyanate/oxazolidine ratio of 2.0 (equivalents to equivalents) and painted onto redwood as a clear varnish. The coating, after curing overnight, as tack free and glossy.

EXAMPLE 72

Preparation of seamless flooring panel utilizing an oxazolidine/isocyanate composition A seamless flooring is laid down by application of a sealer coat (optional) followed by a base coat, one or more chip coats and finally a wear layer. The chip coat comprises a polymeric binder used to bind together decorative chips. This example illustrates the preparation of a seamless flooring panel making use of an oxazolidine/isocyanate mixture as the principal binder or polymer in the chip and wear coats. In this example, the seamless flooring was prepared on panels of tempered Masonite over aluminum. No sealer coat was used. The base coat with a white latex base coat formulated from an acrylic emulsion polymer, and is typical of several base coats available commercially. The chip coat, a mixture of 88 parts of a 50% toluene solution of a copolymer of styrene/butyl methacrylate/butyl acrylate/methyl methacrylate/oxazolidinyl methacrylate (ratio of 25/30/20/3.3/21/7 by weight) and 12 parts of 2-isocyanatoethyl 6-isocyanatocaproate, is applied over the basecoat by paint roller (coverage roughly 80–100 square feet per gallon). Decorative chips are then strewn over the polymer and the polymer is allowed to cure overnight. Excess chips are swept away and the chip coat is sanded with 80 grit sandpaper. A second chip coat is applied in the same way. After sanding this second coat, three coats of the same polymer blend (copolymer solution plus isocyanate) are applied to provide the wear layer, allowing each to cure before applying the next. The first two wear coats are applied by straight edge trowel, and the last by notched trowel. Fully cured, the abrasion resistance index of this flooring, using a Taber Abraser equipped with a CS–10 wheel is 59 mg. loss per 1000 cycles.

It is to be understood that changes and variations may be made without departing from the spirit and scope of the invention as defined by the appended claims.

I claim:

1. A hydrocurable composition comprising an oxazolidine and a polyfunctional isocyanate.

2. A composition according to claim 1 wherein the oxazolidine has the formula

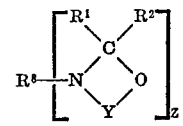

wherein $R^1$ is a hydrogen atom, a phenyl group, a benzyl group, or a ($C_1$–$C_{12}$)alkyl group, and $R^2$ is a hydrogen atom or a ($C_1$–$C_4$)alkyl group, or $R^1$ and $R^2$ are taken together with the attached carbon atom to form a saturated five- or six-membered saturated carbon ring, and Y is the radical

wherein $n$ is 2 or 3, and $R^3$ and $R^4$ are, individually, hydrogen atoms, ($C_1$–$C_{12}$)alkyl groups, ($C_6$–$C_{10}$)aryl groups, or ($C_7$–$C_{12}$)aralkyl or alkaryl groups, $R^8$ is a saturated or unsaturated alkyl or polyvalent alkylene radical having up to 38 carbon atoms, an aralkyl, alkaryl, polyvalent aralkylene, or polyvalent alkarylene radical having up to 25 carbon atoms, or an aryl or polyvalent arylene radical having up to 18 carbon atoms, and $z$ is an integer equal to the valence of $R^8$.

3. A composition according to claim 1 wherein the oxazolidine has the formula

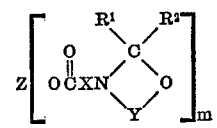

wherein $R^1$ is a hydrogen atom, a phenyl group, a benzyl group, or a ($C_1$–$C_{12}$)alkyl group, and $R^2$ is a hydrogen atom or a ($C_1$–$C_4$)alkyl group, or $R^1$ and $R^2$ are taken together with the attached carbon atom to form a saturated five- or six-membered saturated carbon ring, and Y is the radical

wherein $n$ is 2 or 3, and $R^3$ and $R^4$ are, individually, hydrogen atoms, ($C_1$–$C_{12}$)alkyl groups, ($C_6$–$C_{10}$)aryl groups, or ($C_7$–$C_{12}$)aralkyl or alkaryl groups, Z is a divalent alkylene, a tri- or tetravalent hydrocarbon radical, or a monovalent ($C_1$–$C_{18}$)alkyl group, a group, a ($C_3$–$C_{12}$)cycloalkyl group, a ($C_6$–$C_{12}$) aryl group, or a $C_7$–$C_{15}$)aralkyl or alkaryl group, X is the radical

wherein q is an integer of 2 to 4, and

R⁵ and R⁶ are, individually, hydrogen or unsubstituted or substituted $(C_1-C_6)$alkyl groups, and m is an integer of one to four, and is equal to the valence of Z.

4. A composition according to claim 1 wherein the oxazolidine has the formula

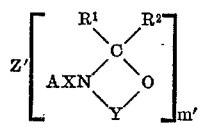

wherein

R¹ is a hydrogen atom, a phenyl group, a benzyl group, or a $(C_1-C_{12})$alkyl group, and R² is a hydrogen atom or a $C_1-C_4$ alkyl group, or R¹ and R² are taken together with the attached carbon atom to form a saturated five- or six-membered saturated carbon ring, and Y is the radical

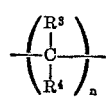

wherein n is 2 or 3, and

R³ and R⁴ are, individually, hydrogen atoms, $(C_1-C_{12})$alkyl groups, $(C_6-C_{10})$aryl groups, or $(C_7-C_{12})$aralkyl or alkaryl groups, X is the radical

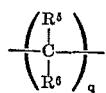

wherein q is an integer of 2 to 4, and

R⁵ and R⁶ are, individually, hydrogen or unsubstituted or substituted $(C_1-C_6)$alkyl groups, Z' is a saturated, polyvalent alkylene radical having up to 38 carbon atoms, a polyvalent phenylene group, a polyvalent halo-substituted phenylene group, a $(C_1-C_8)$alkyl-substituted phenylene group, the divalent hydrocarbon residue of 1,1,3-trimethyl-5-carboxy-3-(p-carboxyphenyl)indane, an unsaturated divalent alkenyl radical having 2 or 3 carbon atoms, or a O=C< group, A is

(the left valence being connected to the Z' radical) or —O—, when Z' is O=C<, and m' is an integer of at least two, and is equal to the valence of Z'.

5. A composition according to claim 1 wherein the oxazolidine is a polymer of an unsaturated oxazolidine of the formula

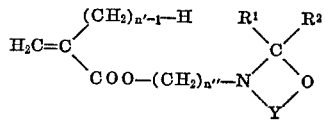

wherein

R¹ is a hydrogen atom, a phenyl group, a benzyl group, or a $(C_1-C_{12})$alkyl group, and R² is a hydrogen atom or a $(C_1-C_4)$alkyl group, or R¹ and R² are taken together with the attached carbon atom to form a saturated five- or six-membered saturated carbon ring, and Y is the radical

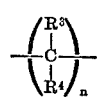

wherein n is 2 or 3, and

R³ and R⁴ are, individually, hydrogen atoms, $C_1-C_{12}$ alkyl groups, $(C_6-C_{10})$aryl groups, or $(C_7-C_{12})$aralkyl or alkaryl groups, n' is 1 or 2, and n'' is 2 or 3.

6. A composition according to claim 1 wherein the oxazolidine has at least one substituent of the formula

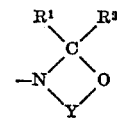

wherein

R¹ is a hydrogen atom, a phenyl group, a benzyl group, or a $(C_1-C_{12})$alkyl group, and R² is a hydrogen atom or a $(C_1-C_4)$alkyl group, or R¹ and R² are taken together with the attached carbon atom to form a saturated five- or six-membered saturated carbon ring, and Y is the radical

wherein n is 2 or 3, and

R³ and R⁴ are, individually, hydrogen atoms, $(C_1-C_{12})$alkyl groups, $(C_6-C_{10})$aryl groups, or $(C_7-C_{12})$aralkyl or alkaryl groups.

7. A composition according to claim 6 wherein the isocyanate has the formula

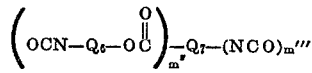

wherein

Q₆ is an alkylene radical having 2 to 8 carbon atoms, and up to one hetero or sulfur atom, Q₇ is a divalent alkylene radical having up to 18 carbon atoms, and m'' and m''' are one or two.

8. A composition according to claim 7 wherein the isocyanate is 2-isocyanatoethyl 6-isocyanatocaproate or 2-isocyanatoethyl 2-isocyanatopropionate.

9. A composition according to claim 6 wherein the isocyanate is an isocyanate prepolymer.

10. A composition according to claim 9 where the isocyanate is a prepolymer of 4,4'-methylene-bis(isocyanatocyclohexane), 2,4-toluene diisocyanate, 3-isocyanatomethyl-3,5,5-trimethylcyclohexylisocyanate, or 2-isocyanatoethyl 2-isocyanatopropionate, with a polyfunctional active hydrogen compound.

11. A composition according to claim 6 wherein n is 2, R³ is a hydrogen atom, and R⁴ is a hydrogen atom.

12. A composition according to claim 6 wherein the ratio of molar equivalents of the isocyanate to the oxazolidine is about 1:10 to about 100:1.

13. A composition according to claim 12 wherein the ratio is about 1:1.1 to about 2.5:1.

14. A process for forming a polymeric material which comprises contacting with water a composition comprising a polyfunctional isocyanate and an oxazolidine having at least one substituent of the formula

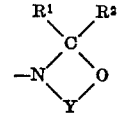

wherein

R¹ is a hydrogen atom, a phenyl group, a benzyl group, or a $(C_1-C_{12})$ alkyl group, and $R^2$ is a hydrogen atom or a ($C_1$–$C_4$) alkyl group, or $R^1$ and $R^2$ are taken together with the attached carbon atom to form a saturated five- or six-membered saturated carbon ring, and Y is the radical

wherein $n$ is 2 or 3, and $R^3$ and $R^4$ are, individually, hydrogen atoms, ($C_1$–$C_{12}$)alkyl groups, ($C_6$–$C_{10}$)aryl groups, or ($C_7$–$C_{12}$)aralkyl or alkaryl groups.

15. A polymeric material formed by a process comprising contacting with water a composition comprising an oxazolidine and a polyfunctional isocyanate.

16. A polymeric material formed by the process of claim 15 wherein the oxazolidine has at least one substituent of the formula

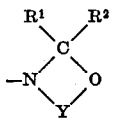

wherein $R^1$ is a hydrogen atom, a phenyl group, a benzyl group, or a ($C_1$–$C_{12}$)alkyl group, and $R^2$ is a hydrogen atom or a ($C_1$–$C_4$)alkyl group, or $R^1$ and $R2$ are taken together with the attached carbon atom to form a saturated five- or six-membered saturated carbon ring, and Y is the radical

wherein $n$ is 2 or 3, and $R^3$ and $R^4$ are, individually, hydrogen atoms, ($C_1$–$C_{12}$)alkyl groups, ($C_6$–$C_{10}$)aryl groups, or ($C_7$–$C_{12}$)aralkyl or alkaryl groups.

17. An article of manufacture comprising a substrate having a coating of the polymeric material of claim 15.

18. An article according to claim 17 wherein the substrate is wood, metal, plastic, paper, or leather.

19. A leather having as a topcoat or as an impregnant the polymeric material of claim 15.

20. An article of manufacture comprising a substrate having an adhesive layer of the polymeric material of claim 15.

21. A film of the polymeric material of claim 15.

References Cited

UNITED STATES PATENTS

| | | | |
|---|---|---|---|
| 3,476,933 | 11/1969 | Mendelsohn | 260—2.5 A C |
| 3,313,747 | 4/1967 | Schramm | 260—77.5 R |
| 3,484,413 | 12/1969 | Kaufman | 260—77.5 |
| 3,546,231 | 12/1970 | King et al. | 260—294.8 |
| 3,037,006 | 5/1962 | Hankins et al. | 260—80.72 |
| 3,160,634 | 12/1964 | Hodge | 260—307 |
| 3,281,310 | 10/1966 | Danielson | 260—307 |
| 3,281,378 | 10/1966 | Garber et al. | 260—2.5 |
| 3,427,346 | 2/1969 | Brotherton et al | 260—485 |
| 3,434,982 | 3/1969 | Kaiser et al. | 260—2.5 |
| 3,438,943 | 4/1969 | Miranda et al. | 260—75 |

MAURICE J. WELSH, Primary Examiner

R. W. GRIFFIN, Assistant Examiner

U.S. Cl. X.R.

117—76 R, 122 PA, 124 E, 132 R, 138.8 A, 142, 148, 155 R, 16 KP, Dig. 7; 252—182; 260—2.5 AC, 75 NQ, 77.5 R, 77.5 AC, 77.5 AP